United States Patent
Al-Saqoufi et al.

(10) Patent No.: US 11,760,812 B1
(45) Date of Patent: Sep. 19, 2023

(54) METHOD FOR PRODUCING CARBOXYMETHYL CELLULOSE FROM DATE PALM FRONDS

(71) Applicant: KING FAISAL UNIVERSITY, Al-Ahsa (SA)

(72) Inventors: Ahmed Bin Saud Al-Saqoufi, Al-Ahsa (SA); Abdul Rahman Bin Mohammad Al-Madini, Al-Ahsa (SA); Nabil Bin Saud Al Balushi, Al-Ahsa (SA); Mohammad Bin Rafdan Hassan Al-Hajhoj, Al-Ahsa (SA); Mohamed Soliman Shathele, Al-Ahsa (SA); Ahmed Meligy Abdelghany Meligy, Al-Ahsa (SA); Mohammed Mohammed Mahmoud Elgarawany, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/096,525

(22) Filed: Jan. 12, 2023

(51) Int. Cl.
*C08B 11/12* (2006.01)

(52) U.S. Cl.
CPC .................... *C08B 11/12* (2013.01)

(58) Field of Classification Search
CPC ...................................... C08B 11/12
See application file for complete search history.

(56) References Cited

U.S. PATENT DOCUMENTS 3,574,188 A * 4/1971 Takehara et al. ....... C08B 11/12
536/88

FOREIGN PATENT DOCUMENTS

MY     142372 A     11/2010

OTHER PUBLICATIONS

Elrayah et al. ("Drilling Fluids Additive sodium Carboxymethyl Cellulose (CMC) Produced from Palm Frond", 2020 International Petroleum and Petrochemical Technology Conference at Shanghai, China, Aug. 2020) (Year: 2020).*
Albasheer, "Synthesis and Characterization of Carboxymethyl Cellulose from (Date palm) *Phoenix dactylifera* L. Leaves," SUST Repository, Feb. 10, 2020.

* cited by examiner

*Primary Examiner* — Leigh C Maier
*Assistant Examiner* — Everett White
(74) *Attorney, Agent, or Firm* — Nath, Goldberg & Meyer; Richard C. Litman

(57) ABSTRACT

The method for producing medium viscosity carboxymethyl cellulose from date palm fronds includes drying date palm fronds, grinding the dried date palm fronds to a powder, mixing the powder with an alkaline solution to a provide a slurry, isolating a cellulose extract from the slurry, drying the cellulose extract, grinding the dried cellulose extract to a powder, adding isopropanol to the powder to provide a mixture, adding an alkaline solution to the mixture to provide an alkaline mixture, and adding a mixture of monochloroacetic acid and trichloroacetic acid to the alkaline mixture to provide carboxymethyl cellulose (CMC) as an alkaline salt thereof. The CMC can be used for cultivating desert land while saving water.

6 Claims, 6 Drawing Sheets

METHOD FOR PRODUCING CARBOXYMETHYL CELLULOSE FROM DATE PALM FRONDS

BACKGROUND

1. Field

The disclosure of the present patent application relates to production of carboxymethyl cellulose and, particularly, to a method of producing medium viscosity carboxymethyl cellulose from date palm fronds.

2. Description of the Related Art

Date palm fronds in date-producing countries are a major burden on date farms and date canning plants, causing significant environmental pollution. For example, there is significant accumulation of palm leaf, fronds, worn logs, and remnants of infected or deformed dates throughout these lands. The palm tree produces an average of 21-23 kg of waste per year. Saudi Arabia contains 28,571,804 palm trees and Al-Ahsa Oasis has 504,914 palm trees. Each palm produces an average annual waste of 21-23 kg of the fronds, resulting in 600-675 million tons of waste. Accordingly, an efficient method of disposing and utilization of date palm waste is needed.

Carboxymethyl cellulose (also called carboxymethylcellulose or CMC), or its sodium salt, is a polymer with many known uses, particularly in the food and pharmaceutical industries. The present inventors envision its use in agriculture, particularly for enriching and reclaiming arid or desert land for use in farming due to its property of retaining water in the soil. It would be highly desirable to provide a method of making carboxymethyl cellulose and its sodium salt from date palm fronds to provide a commercially valuable product in date-producing countries where the fronds otherwise contribute to waste and environmental problems after the useful date-producing life of the date palm tree is over.

Thus, a method for producing medium viscosity carboxymethyl cellulose from date palm fronds solving the aforementioned problems is desired.

SUMMARY

The method for producing medium viscosity carboxymethyl cellulose from date palm fronds includes drying date palm fronds, grinding the dried date palm fronds to a powder, mixing the powder with an alkaline extraction solvent to a provide a slurry, isolating a cellulose extract from the slurry, drying the cellulose residue, grinding the dried cellulose residue to a powder, adding an alkaline solution to the powder to provide an alkaline mixture, and adding a mixture of monochloroacetic acid (ClCH$_2$COOH) and trichloroacetic acid (Cl$_3$CCOOH) at ratio 1:3 (W/W) to the alkaline to the alkaline mixture to provide carboxymethyl cellulose (CMC). The CMC or its sodium salt can be used for cultivating desert land while saving water.

These and other features of the present subject matter will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

A method for producing medium viscosity carboxymethyl cellulose from date palm fronds includes drying date palm fronds, grinding the dried date palm fronds to a powder, mixing the powder with an alkaline extraction solvent to provide a slurry, subjecting the slurry to nitric acid hydrolysis to isolate a cellulose residue from the slurry, drying the cellulose residue, reducing the dried cellulose extract to a powder, adding an alkaline solution to the powder to provide an alkaline mixture, and adding a mixture of monochloroacetic acid and trichloroacetic acid to the alkaline mixture to provide carboxy methylcellulose. The cellulose residue can be isolated by blending the slurry with a mixture of nitric acid and ethanol and washing the resulting mixture. The cellulose extract can be dried at a temperature of 60° C. Preferably, a ratio of the monochloroacetic acid and trichloroacetic acid is about 1:3 (w/w) to carboxymethylate the cellulose.

The cellulose is modified to carboxy methylcellulose (CMC) as a result of a change in cellulose crystallinity which allows the etherifying agent to have access to the cellulose molecule. This morphology decreases the microporosity of the network, thus leading to lower water absorption capacity of the resulting CMC.

Figure 1:
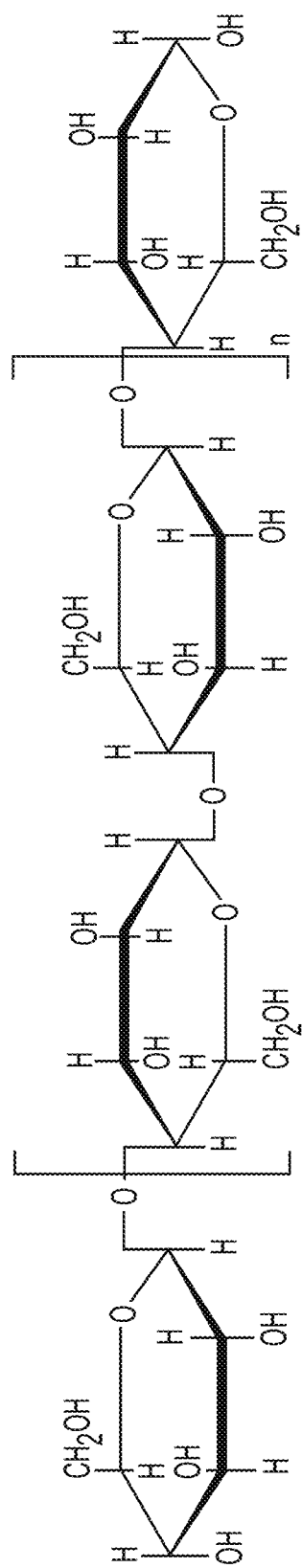
FIG. 1 depicts the structure of cellulose.

Cellulose is a simple linear polymer consisting of anhydroglucopyranose unit (AGU) linked together with β-(1,4)-glycosidic bonds formed between carbon 1 and carbon 4 of adjacent glucose (FIG. 1). Each of the AGU units consists of three hydroxyl groups at carbon 2, 3 and 6 positions. Cellulose aligns in parallel in fibrils, which are surrounded by a matrix of lignin and hemicellulose. In addition, cellulose has properties such as low density, good mechanical properties, and bio-degradability.

"Medium viscosity" CMC refers to a viscosity of 400 to 800 centipoise (cps) of a 2% CMC solution in water at 25° C. CMC is a linear, long chain, water soluble, anionic polysaccharide derived from cellulose. The preparation of CMC involves two reaction steps, including alkalization and etherification. During alkalization, cellulose is treated with NaOH, often in the presence of an inert solvent (ethanol or isopropanol), which acts both as a swelling agent and as a diluting agent which facilitates good penetration to the crystalline structure of cellulose. It solvates the hydroxyl groups and thus makes them available for etherification. The alkalization process can be performed at room temperature. During etherification, the alkali cellulose is reacted with NaMCA or as a free acid, MCA, to form carboxymethyl cellulose ethers. At the same time, NaOH reacts with MCA to form two by-products, which are sodium glycolate and sodium chloride.

The sodium salt of carboxymethyl cellulose has the following structure:

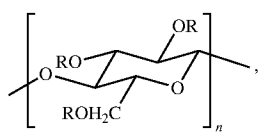

where R is H or $CH_2COONa$. The degree of substitution is the average number of $CH_2COONa$ groups per monomer up to a maximum of three groups per monomer.

The steps of CMC (sodium salt) formation can be summarized by the following equations:

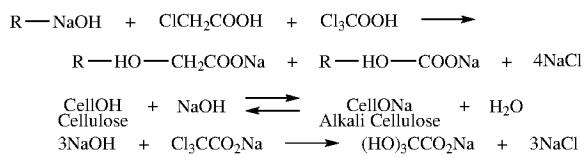

The chemicals used in the extraction and purification of cellulose can be reused. The CMC can be used in cultivating desert land, thereby facilitating savings of irrigation water. CMC can improve the physical and natural characteristics of desert soil by retaining water in the land. In Saudi Arabia, for example, increased use of desert land can be facilitated by this type of "soil conversion."

The present teachings are illustrated by the following examples.

Example 1

Extraction of Cellulose from Date Palm Fronds

Date palm fronds from date palm trees grown in Saudi Arabia were cleaned and sun-dried for 12 days. The dried fronds were macerated or cut into small pieces and ground into a powder (approximately 4 microns in particle size). The plant powder (5 g) was added to 750 mL NaOH (0.5 M) and heated at 95° C. for two hours with stirring to provide a slurry. The slurry was washed with distilled water (1 L) providing a dark slurry. The dark slurry including cellulose extracted from the fronds was filtered and washed with 1 L of distilled water.

The washed slurry was reflux blended with a mixture containing 20% (v/v) of nitric acid/ethanol (two successive portions). The mixture was washed with distilled water until the wash water, to which a drop of NaOH (0.5 M) was added, no longer turned the phenolphthalein indicator pink in color, thereby neutralizing the washed filtrate. The cellulose residue was dried at 60° C. in an oven to a steady weight. The dried cellulose was ground to a powder and kept in a polyethylene pack until used for synthesis of carboxymethyl cellulose.

Example 2

Synthesis of Carboxymethyl Cellulose (CMC) from the Cellulose Extract

The cellulose powder (5 g) extracted from the date palm fronds in Example 1 was added to isopropanol (150 mL, stirring) with persistent mixing. Then, NaOH in serial concentrations (15 mL of each 5%, 10%, 15%, 20%, 25% and 30% w/v)) was added dropwise into the blend and further mixed for an hour at room temperature. The carboxymethylation process was started by adding monochloroacetic acid and trichloroacetic acid at a ratio of 1:3 by weight of both (the total weight of MCA and TCA equaling 6 g) with consistent blending for another 1.5 hours. The blend was spread with aluminum foil and set into the oven at 60° C. for 3.5 hours. The resulting slurry was absorbed with methanol (100 mL, overnight). Acetic acid (90%) was added to the slurry until pH 7 was reached. The slurry was then filtered. The product filtrate was washed multiple times using ethanol (50 mL) for 10 minutes to evacuate secondary products or impurities. Afterwards, the product was washed again with methanol (100 mL). The CMC from date palm fronds was collected, dried at 60° C. to a steady weight, and kept in a dry spot. The reaction steps of cellulose with NaOH and, subsequently, MCA and TCA can be summarized by the following equation:

$$[C_6H_7O_2(OH)_3]_n + n\ NaOH \rightarrow C_6H_7O_2(OH)_2 ONa]_n + nH_2O \qquad (1)$$

$$[C_6H_7O_2(OH)_2ONa]_n + nClCH_2COONa \rightarrow [C_6H_7O_2 (OH)_2OCH_2COONa]_2 + nNaCl \qquad (2)$$

$$NaOH + ClCH_2COONa \rightarrow HoCH_2COONa + NaCl \qquad (3)$$

$$[C_6H_7O_2(OH)_2ONa]_n + nCl_3CCOONa \rightarrow C_6H_7O_2 (OH)_2OCCOONa]_2 + nNaC \qquad (4)$$

$$3NaOH + Cl_3CCOONa \rightarrow (HO)_3CCOONa + 3NaCl \qquad (5)$$

The yield of cellulose extracted from date palm fronds and the yield of CMC was measured based on a dry weight basis. The yield of cellulose, expressed in a percentage, was calculated based on the amount of date palm fronds using Eq. (6). Moreover, the yield of CMC was determined by dividing the net dry weight of CMC with 5 g of dry cellulose as shown in Eq. (7).

$$\text{Yield of cellulose (\%)} = \frac{\text{weight of cellulose obtained }(g)}{\text{weight of palm fronds used }(g)} \times 100 \qquad (6)$$

$$\text{Yield of CMC (\%)} = \frac{\text{weight of CMC }(g)}{\text{Dry weight of palm fronds usedcellulose }(g)} \times 100 \qquad (7)$$

From the measurement, alkali treatment of date palm fronds followed by nitric acid hydrolysis recovered 44.0% of cellulose and resulted in 147.25% yield of CMC. The percentage yield of CMC increased with increasing NaOH concentration due to the reaction of cellulose with the mixture of monochloroacetic acid (MCA) and trichloroacetic acid (TCA). An alkaline condition caused the substitution of the hydroxyl group of cellulose molecules with carboxymethyl group. The results showed that the $DS_{abs}$ (degree of substitution) was related to the higher yield of CMC. The optimum concentration of NaOH was 25% which resulted in the maximum yield of CMC, described above.

Example 3

Purification of CMC

The CMC obtained in Example 2 was dissolved in distilled water (100 mL at 80° C.), then stirred for 10 minutes.

The mixture was centrifuged at 4000 rpm (for 1 min.). The centrifuged CMC was resolved in acetone (100 mL). The mixture was then filtered and he resulting CMC was dried at 60° C. in a stove until a steady weight was achieved. The dried mixture was kept in a desiccator.

Example 4

Characterization of CMC

Outright estimation of the DS was controlled by the standard strategy ASTM D1439 using dry powder of CMC sodium salt (NaCMC) (4 g), then mixed with 95% ethanol (75 mL) for 5 minutes. Nitric acid (5 mL, 2M) was added to form an acidic structure, H-CMC. The mixture was boiled and stirred for 10 minutes. The liquid phase of the mixture was removed and the solid phase was washed using ethanol 80% (20 mL, 5 times at 60° C.). The resulting residue was washed in anhydrous methanol, then filtered and transferred to an Erlenmeyer flask (250 mL) with 5 g of NaCMC and distilled water (100 mL). Then, NaOH (25 mL, 0.3 M) was added to the flask and the mixture was boiled for 15 min. Phenolphthalein reagent was added to the mixture, then titrated using hydrochloric acid (0.3M) to get a colorless (from pink) mixture. Titration was repeated three times.

Example 5

Scanning Electron Microscopy (SEM) Analysis

Scanning electron microscopy (SEM) analysis was carried out on the extracted cellulose and CMC to study its surface texture. The micrographs were recorded on a (Jeol jsm-55101v) operated with an accelerating voltage of 15 kv. A high performance scanning electron microscope was used for fast characterization and imaging of fine structures on both small and large samples. Prior to the analysis by SEM, the 10 mm sample powders were spread onto an aluminum stub and covered with a conductive carbon tape, such that the powder was evenly distributed on the surface of the carbon tape. The samples were coated with a mixture of gold and palladium (about 27.0 nm) by a sputter coater (Polaron SC 7640).

Figure 3:
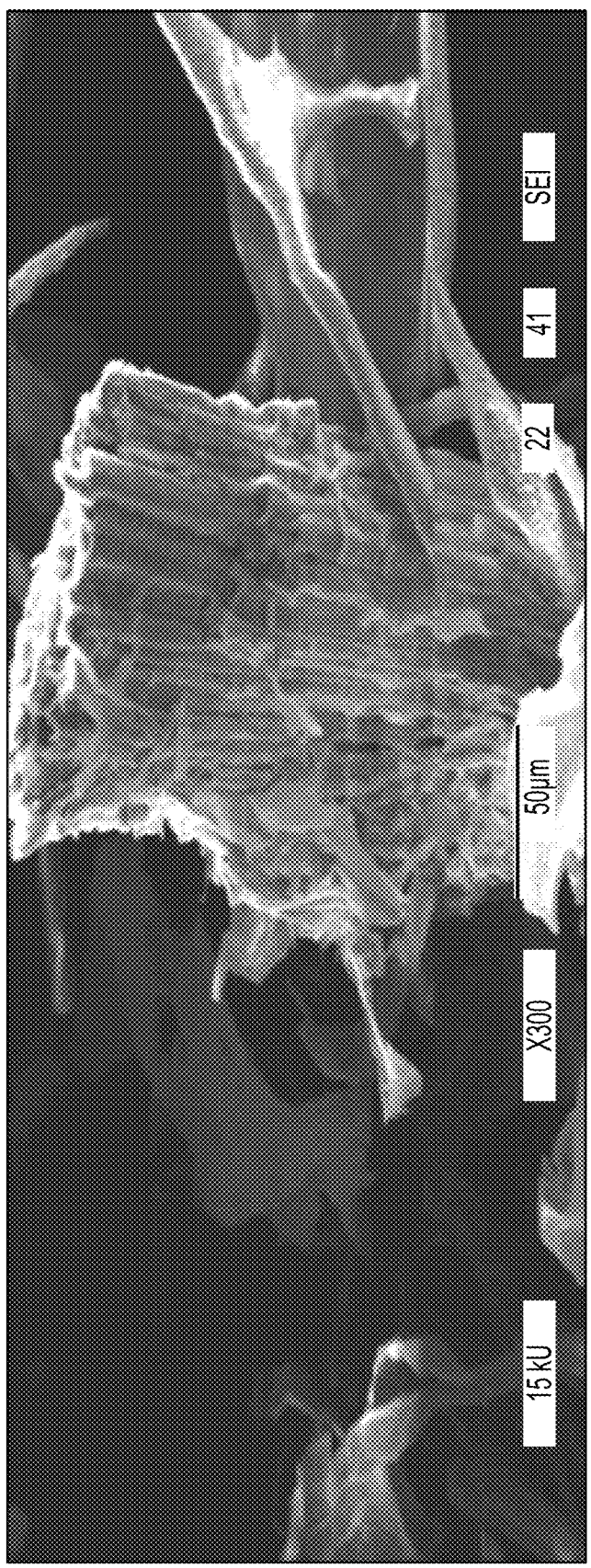
FIG. 3 is a scanning electron micrograph (SEM) of crude cellulose microfiber (BAR, 50 μm).

FIG. 3 is a scanning electron micrograph (SEM) of crude cellulose microfiber (longitudinal section) of date palm fronds before pre-treatment.

Figure 4:
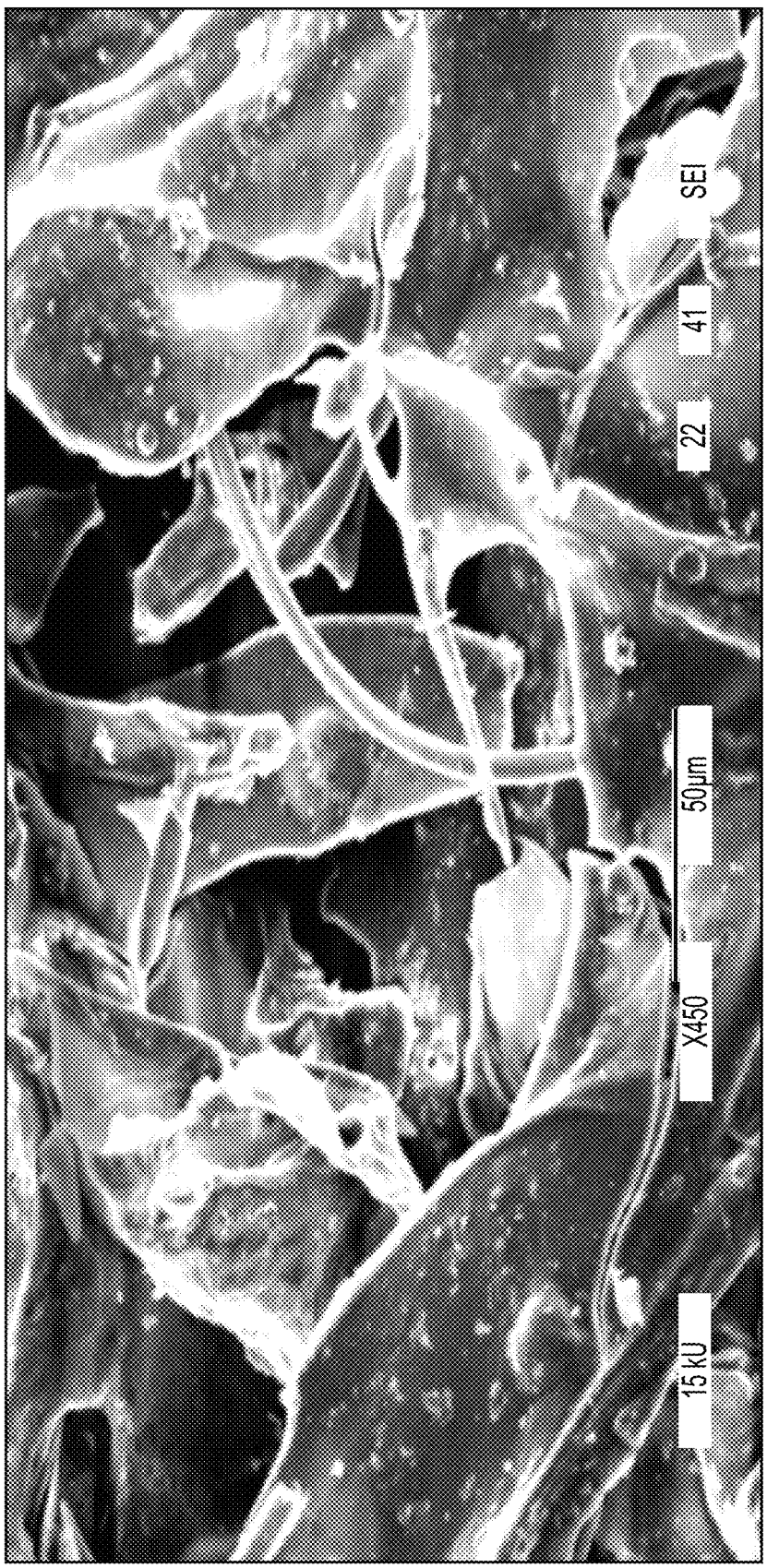
FIG. 4 is a scanning electron micrograph (SEM) (magnification ×450) of carboxy-methyl cellulose (CMC) synthesized using date palm fronds, as described herein (BAR, 50 μm).

FIG. 4 is a scanning electron micrograph (SEM) (magnification ×450) of the carboxy-methyl cellulose (CMC) prepared by etherification of cellulose with monochloroacetic acid. Cellulose was first recovered by chemical pulping prior to CMC synthesis. The exterior surface of cellulose seemed rough and the fibers were twisted and ruptured. This may have been caused by the use of strong chemicals and high temperatures in the cellulose extraction process. For the synthesized CMC, the roughness was slightly decreased when compared with cellulose.

Figure 5:
FIG. 5 is a scanning electron micrograph (SEM) of the etherification step and splintered carboxy-methyl cellulose (CMC) (BAR, 100 μM).
Figure 6:
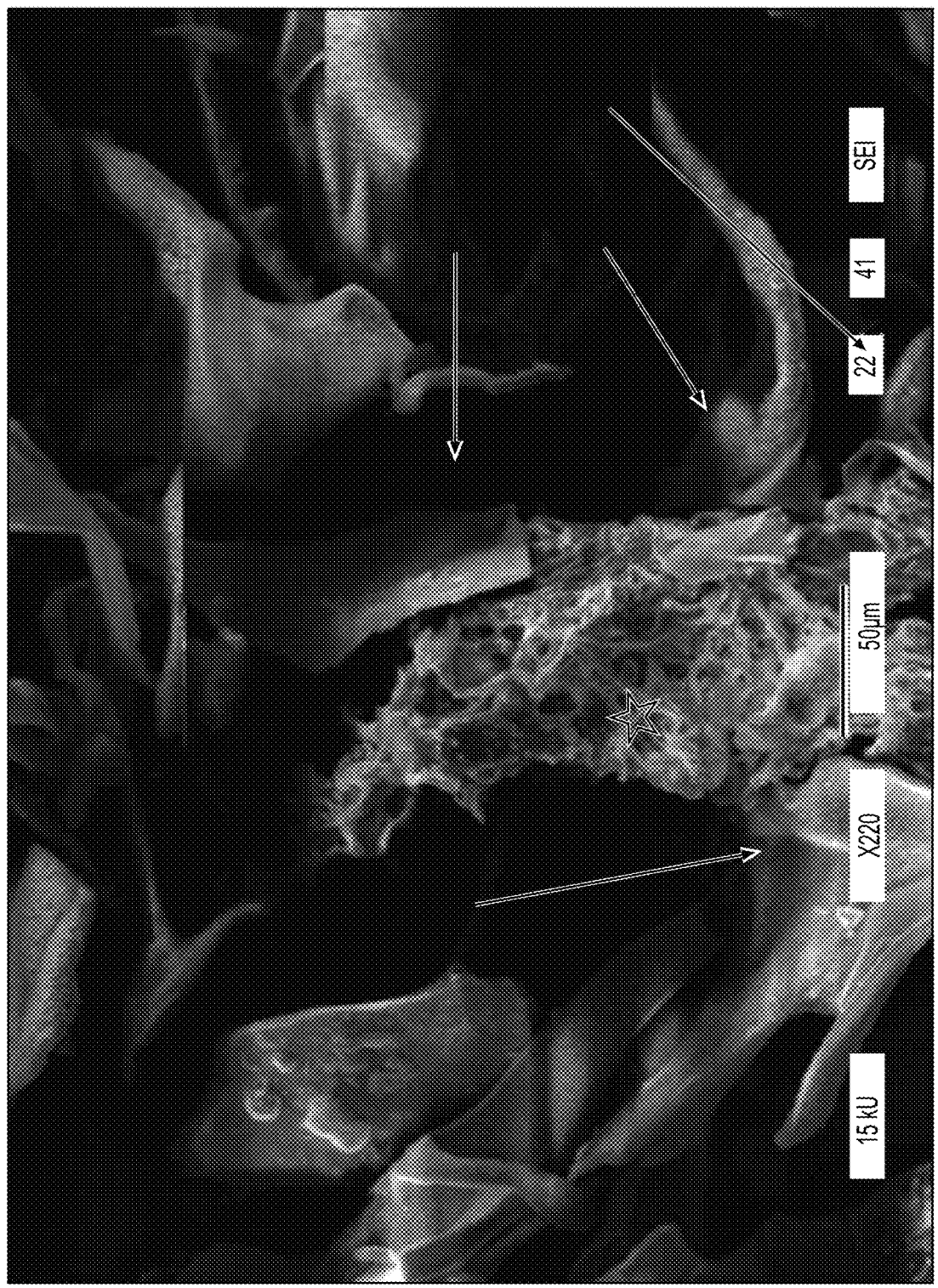
FIG. 6 is a scanning electron micrograph (SEM) (magnification ×300) of the etherification step and splintered carboxy-methyl cellulose (CMC) (BAR, 50 μM).

FIGS. 5-6 are scanning electron micrographs (SEM) of the etherification step and splintered CMC. The alkali cellulose is reacted with monochloroacetate acid (NaMCA) (identified by arrows) which was easily detected. This secondary structure seals the primary one (palm fronds cellulose) (star). This can be attributed to the higher viscosity of the solution that was capable of incorporating and retaining a larger amount of small air bubbles, creating a more stable solution. This morphology decreases the microporosity of the network, thus leading to lower water absorption capacity of this CMC.

Example 6

Fourier Transform Infrared Spectroscopy (FTIR) Analysis

The functional groups of the CMC were determined using infrared spectrophotometer Shimadzu— IR Affinity-1S Fourier transform double beam. Tested substrates (2 mg) were dried at 60° C., mixed with potassium bromide, blended, and ground finely to form a pellet. The infrared spectra of these samples were measured in the transmission of a wavelength range between 4000 and 400 $cm^{-1}$.

Figure 2:
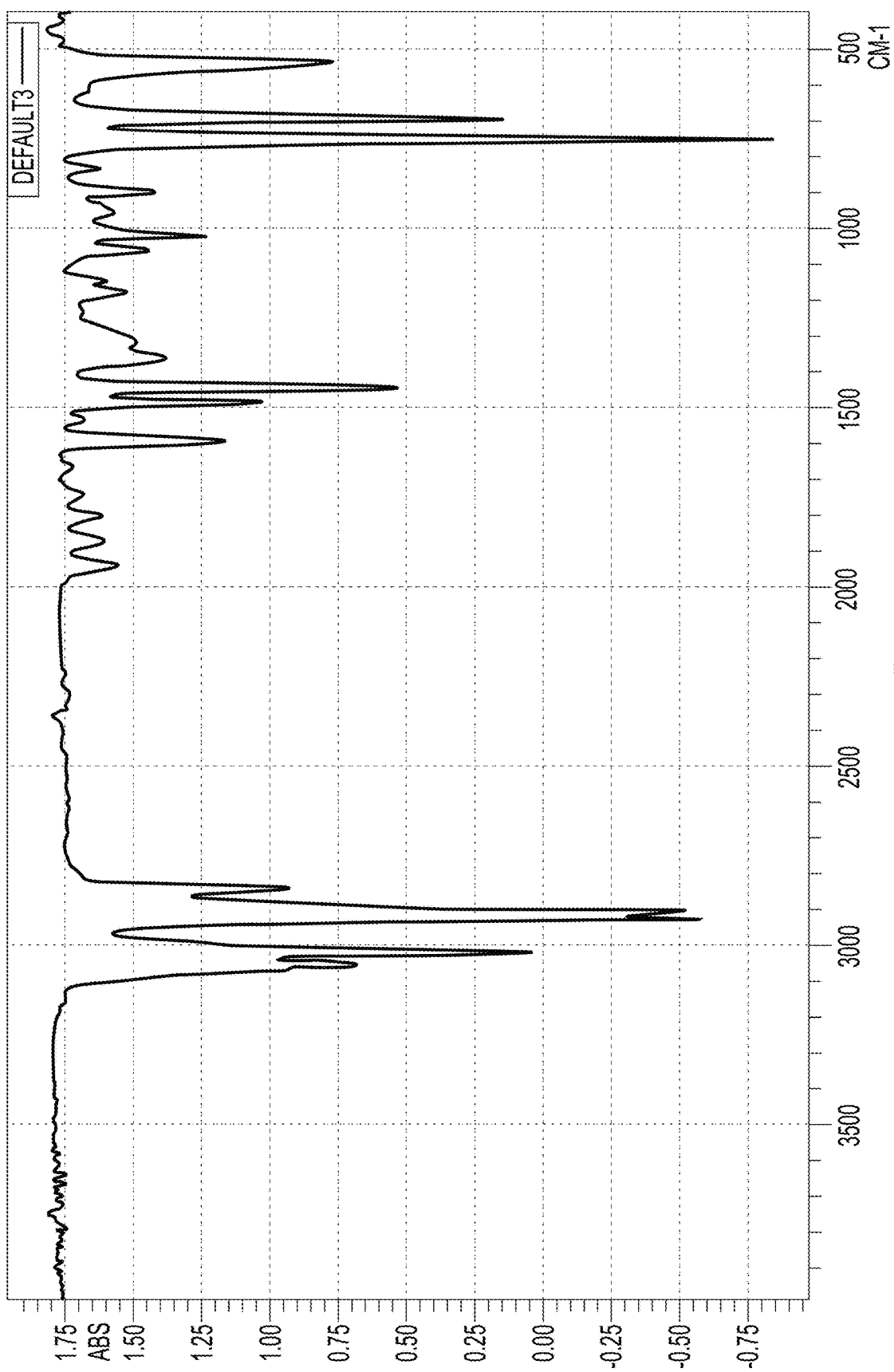
FIG. 2 is the FTIR spectrum of CMC obtained from ground date palm fronds, as described herein.

FTIR spectrum of CMC obtained from ground date palm fronds is displayed in FIG. 2. The following observations were made from the FTIR. The absorption of the carbonyl group (C=O) is shown in the 1530 $cm^{-1}$ range of the aldehyde group in atom number 1 (which is the pyran ring between atom number one and atom number five in the cellulose unit of B-D-Glucopyranose). Carboxyl groups appear in the salts of the carboxy methylcellulose compound (wave number 1589 $cm^{-1}$ of the carbonyl group (C=O) and 1440 $cm^{-1}$ for the C—O group). The carboxyl group appears in carboxy methylcellulose compound at 1606 $cm^{-1}$. Methylene groups ($CH_2$) appear at 1445 $cm^{-1}$, while the bond between the carbon atoms in the pyran ring appears in the range 1148-1164 $cm^{-1}$. The glycoside bond (C—O—C) between rings appears at 1050 $cm^{-1}$. The hydroxyl group (OH) curve appears at 1325 $cm^{-1}$ linked with sodium (ONa). Free hydroxyl groups (OH) appear at 3200-3500 (3024) $cm^{-1}$. Linked hydroxyl groups (—OH) are shown at 3,059 $cm^{-1}$. The CH stretching vibration curve appears at 2927 $cm^{-1}$.

A footprint of compounds appears at 756 $cm^{-1}$ wavelength, indicating alkene C—H groups. In view of the results obtained, it was concluded that the substance is a sodium salt of CMC.

The degree of substitution (DS) of carboxyl groups formed in CMC can be calculated using infrared radiation spectra (IR-spectra) and potentiometric titration. Relative values of DS ($DS_{rel}$) and absolute values of DS ($DS_{abs}$) were measurements obtained from IR-spectra and potentiometric titration, respectively. The $DS_{abs}$ and $DS_{rel}$ were 0.5084 and 1.1741, respectively using NaOH (25%).

The carboxymethyl content and the $DS_{abs}$ were calculated based on Eq. (8) and (9), respectively.

$$\text{Carboxymethyl content (\% } CM) = [(V_o - V_n) M \times 0.059 \times 100]/m \tag{8}$$

$$\text{Degree of substitution}(DS_{abs}) = 162 \times \% \ CM/[5900 - (58 \times \% \ CM)] \tag{9}$$

Where
Vo=mL of HCl (for blank sample titrate).
Vn=mL of HCl (for samples titrate).
M=HCl concentration (Molar).
m=weight of samples (g).

The molar mass of —$CH_2COOH$, anhydroglucopyranose unit (AGU) were 59 g/mol and 162 g/mol, respectively.

The modified equation provided an estimate of the $D_{Srel}$ of carboxyl groups in CMC by taking the ratio of absorption spectra as shown in Eq. (10):

$$DS_{rel} = (A1616/A2927) - B \tag{10}$$

The absorbance for the stretching vibration of the carboxyl group (COO—) and the stretching vibration of methine (C—H) was at 1616 cm$^{-1}$ and 2927 cm$^{-1}$, respectively. The numerical constant (B) was A1616/A2896 cellulose ratio (equal zero). The practical CMC DS$_{abs}$ was 0.5084. CMC prepared from alkalization then carboxymethylation utilizing MCA and TCA had values between 0.4-1.3.

It is to be understood that the method for producing medium viscosity carboxymethyl cellulose from date palm fronds is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method for producing medium viscosity carboxymethyl cellulose from date palm fronds, comprising:
   extracting cellulose from powdered date palm fronds;
   grinding the extracted cellulose to provide a cellulose powder;
   adding alcohol to the cellulose powder to provide a mixture of alcohol and the cellulose extracted from date palm fronds;
   adding sodium hydroxide to the mixture to provide an alkaline mixture of alcohol and the cellulose extracted from date palm fronds;
   adding a mixture of CH$_2$ClCOOH and Cl$_3$CCOOH to the alkaline mixture to begin carboxymethylating the cellulose extracted from date palm fronds and provide a slurry;
   heating the slurry to complete carboxymethylation of the cellulose extracted from date palm fronds; and
   isolating carboxymethyl cellulose made from date palm fronds as an alkaline salt thereof;
   wherein the step of adding a mixture of CH$_2$ClCOOH and Cl$_3$CCOOH to the alkaline mixture comprises adding a mixture of CH$_2$ClCOOH and Cl$_3$CCOOH in a ratio of monochloroacetic acid to trichloroacetic acid of about 1:3 (w/w); and
   wherein the viscosity of a 2% solution of the medium viscosity carboxymethyl cellulose in water at 25° C. is between 400 to 800 centipoise.

2. The method for producing medium viscosity carboxymethyl cellulose of claim 1, wherein the date palm fronds were obtained from date palm trees grown in Saudi Arabia.

3. The method for producing medium viscosity carboxymethyl cellulose of claim 1, wherein the cellulose extracted from date palm fronds is dried at a temperature of 60° C. prior to said step of adding alcohol to the cellulose powder.

4. The method for producing medium viscosity carboxymethyl cellulose of claim 1, wherein said step of extracting cellulose from powdered date palm fronds comprises extracting cellulose from powdered date palm fronds in an aqueous solution of sodium hydroxide.

5. The method for producing medium viscosity carboxymethyl cellulose of claim 1, wherein said step of extracting cellulose from powdered date palm fronds further comprises the steps of:
   heating the aqueous solution of sodium hydroxide containing the powdered date palm fronds to 95° C. for two hours with stirring, thereby forming a slurry;
   washing the slurry with distilled water, resulting in a dark slurry;
   filtering the dark slurry to obtain a filtrate;
   washing the filtrate with distilled water;
   refluxing the filtrate in a mixture of nitric acid and ethanol (20% v/v);
   washing the filtrate with distilled water until neutral by phenolphthalein indicator; and
   drying the washed filtrate to obtain the cellulose extracted from date palm fronds.

6. The method for producing carboxymethyl cellulose of claim 1, wherein said step of adding alcohol to the cellulose powder comprises adding isopropanol to the cellulose powder.

* * * * *